(12) United States Patent  (10) Patent No.: US 9,089,241 B2
Zoucha  (45) Date of Patent: Jul. 28, 2015

(54) APPARATUS FOR COOKING FOOD

(76) Inventor: James Zoucha, Orchard, NE (US)

( * ) Notice: Subject to any disclaimer, the term of this patent is extended or adjusted under 35 U.S.C. 154(b) by 601 days.

(21) Appl. No.: 13/494,123

(22) Filed: Jun. 12, 2012

(65) Prior Publication Data

US 2013/0327226 A1  Dec. 12, 2013

(51) Int. Cl.
 *A47J 37/07* (2006.01)

(52) U.S. Cl.
 CPC .................. *A47J 37/0722* (2013.01)

(58) Field of Classification Search
 CPC .......... A47J 43/18; A47J 37/01; A21B 3/132; A21B 3/13; A23L 1/0128
 USPC ........... 99/426, 416, 449, 410, 413, 414, 402, 99/419, 444, 385, 390, 393, 400–401, 421, 99/425; 126/25 R, 30, 41 R, 40, 50, 92 R, 126/201, 276
 See application file for complete search history.

(56) References Cited

U.S. PATENT DOCUMENTS

| 3,363,543 | A | * | 1/1968 | Roberts et al. | ............ 99/421 HV |
| 4,089,258 | A | * | 5/1978 | Berger | ............... 99/339 |
| 4,421,015 | A | | 12/1983 | Masters et al. | |
| 4,984,515 | A | * | 1/1991 | Pivonka | ............... 99/449 |
| 6,276,356 | B1 | | 8/2001 | Ragland et al. | |
| 6,732,637 | B2 | | 5/2004 | Artt | |
| 8,109,205 | B1 | * | 2/2012 | Winer | ............... 99/359 |

\* cited by examiner

*Primary Examiner* — Tu B Hoang
*Assistant Examiner* — Phuong Nguyen
(74) *Attorney, Agent, or Firm* — Dennis L. Thomte; Thomte Patent Law Office LLC

(57) ABSTRACT

An apparatus for cooking food which is used in combination with an infrared heater having an intake end and a discharge end from which infrared rays are emitted therefrom. A wire grill basket supporting structure is operatively secured to the heater at the outer side of the protective grill thereof for supporting one or more wire grill baskets, having food therein, in a vertically disposed manner whereby the infrared rays emitted from the heater will cook the food contained within the one or more wire grill baskets.

1 Claim, 4 Drawing Sheets

APPARATUS FOR COOKING FOOD

BACKGROUND OF THE INVENTION

1. Field of the Invention

This invention relates to an apparatus for cooking food such as meat, seafood, chicken, etc. More particularly, the apparatus of this invention includes an infrared radiant heater which heats food which is spaced from the discharge end of the infrared radiant heater and which is supported by the protective grill of the infrared radiant heater.

2. Description of the Related Art

Many attempts have been previously provided for cooking foods by way of radiant heat. For example, see U.S. Pat. Nos. 4,089,258; 4,421,015; 6,276,356; and 6,732,637. Although the devices of the prior art may cook food with radiant heat, the prior art devices seem to be very complicated and expensive. Further, it is not believed that the prior art methods of cooking foods are convenient to use and perhaps do not perform the cooking operation in a satisfactory manner. Further, the prior art devices do not provide an attachment which may be connected to and supported by a conventional infrared radiant heater such as those infrared radiant heaters of the Val6 Series manufactured by Shizouka Seika Co., Ltd., having an address of 4-1 Yamana, Fukuroi-shi, Shizouka-ken, Japan 437-8601.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An apparatus for cooking food is disclosed comprising an infrared radiant heater (hereinafter "infrared heater") having an intake end and a discharge end from which infrared rays are emitted therefrom. The infrared heater has a curved shroud positioned above the discharge end thereof. The infrared heater includes a protective grill or safety guard supported thereon which is spaced outwardly from the discharge end thereof. The safety guard is spaced below the curved shroud. A wire grill basket supporting structure is operatively secured to the heater outwardly of the safety guard for supporting one or more wire grill baskets, having food therein, in a vertically disposed manner whereby the infrared rays emitted from the heater will cook the food contained within the said one or more wire grill baskets.

In the preferred embodiment, the wire grill basket supporting structure is selectively removably secured to the safety guard.

In the preferred embodiment, the grill basket supporting structure includes an upper horizontally disposed support member and a lower horizontally disposed support member. In that embodiment, the upper horizontally disposed support member has an inverted, generally V-shaped cross-section and the lower horizontally disposed support member has a generally V-shaped cross-section. In the preferred embodiment, the one or more wire grill baskets are received by and extend between the upper and lower support members.

It is therefore a principal object of the invention to provide an improved apparatus for cooking food.

A further object of the invention is to provide an improved apparatus for cooking food wherein a wire grill basket supporting structure is operatively secured to an infrared heater at the discharge side thereof with the wire grill basket supporting structure adapted to support one or more wire grill baskets in a vertically disposed position outwardly of the discharge end of the infrared heater.

A further object of the invention is to provide an apparatus of the type described which ensures that the food being cooked such as meat, chicken, seafood will be quickly and easily cooked with a minimum of time.

A further object of the invention is to provide an apparatus for cooking food which is easily secured to a conventional infrared heater at the discharge side thereof in a spaced relationship thereto.

A further object of the invention is to provide an apparatus for cooking food which is economical of manufacture, durable in use and refined in appearance.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
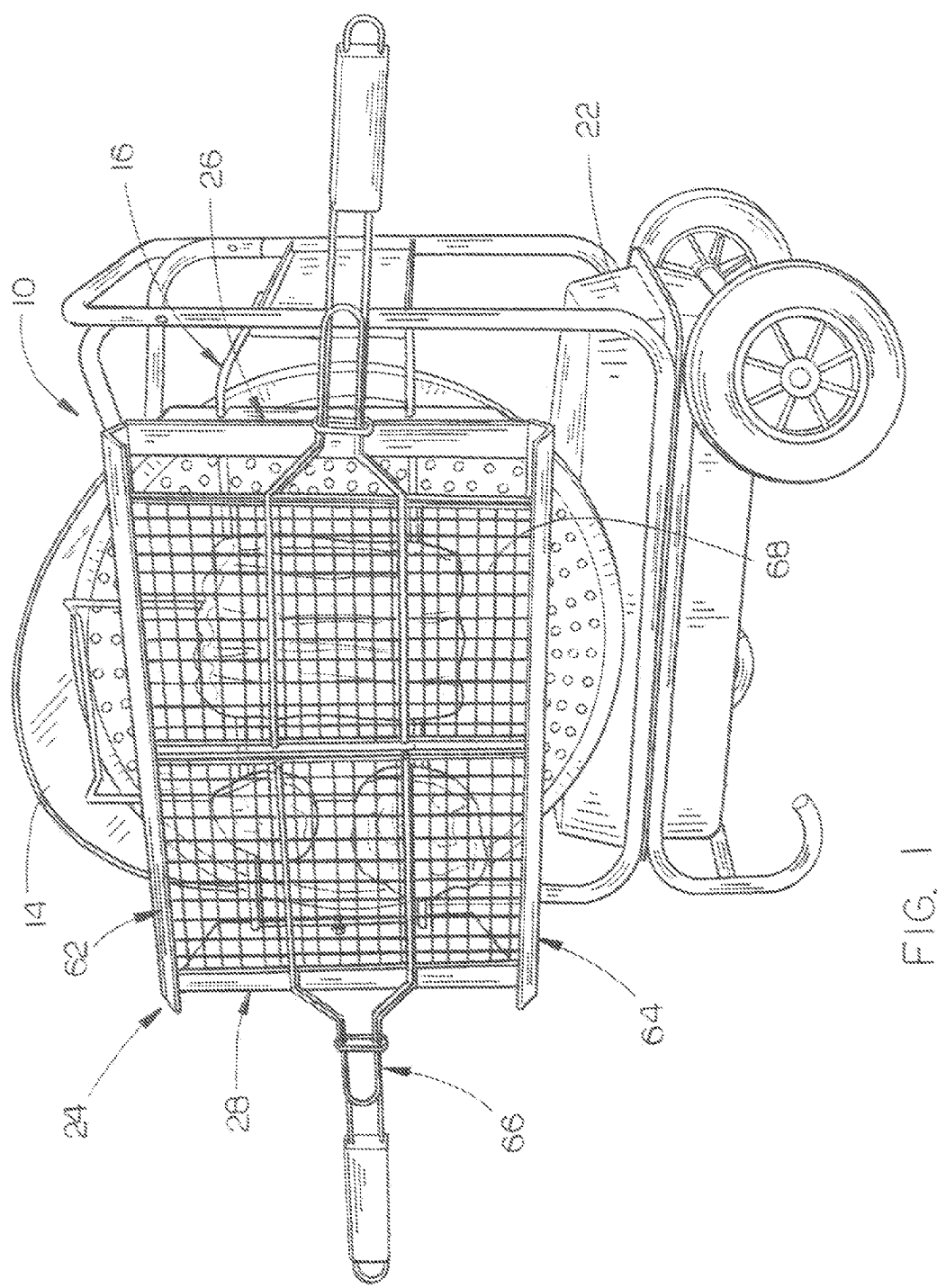
FIG. 1 is a front prospective view of an infrared heater having the apparatus of this invention mounted thereon.
Figure 2:
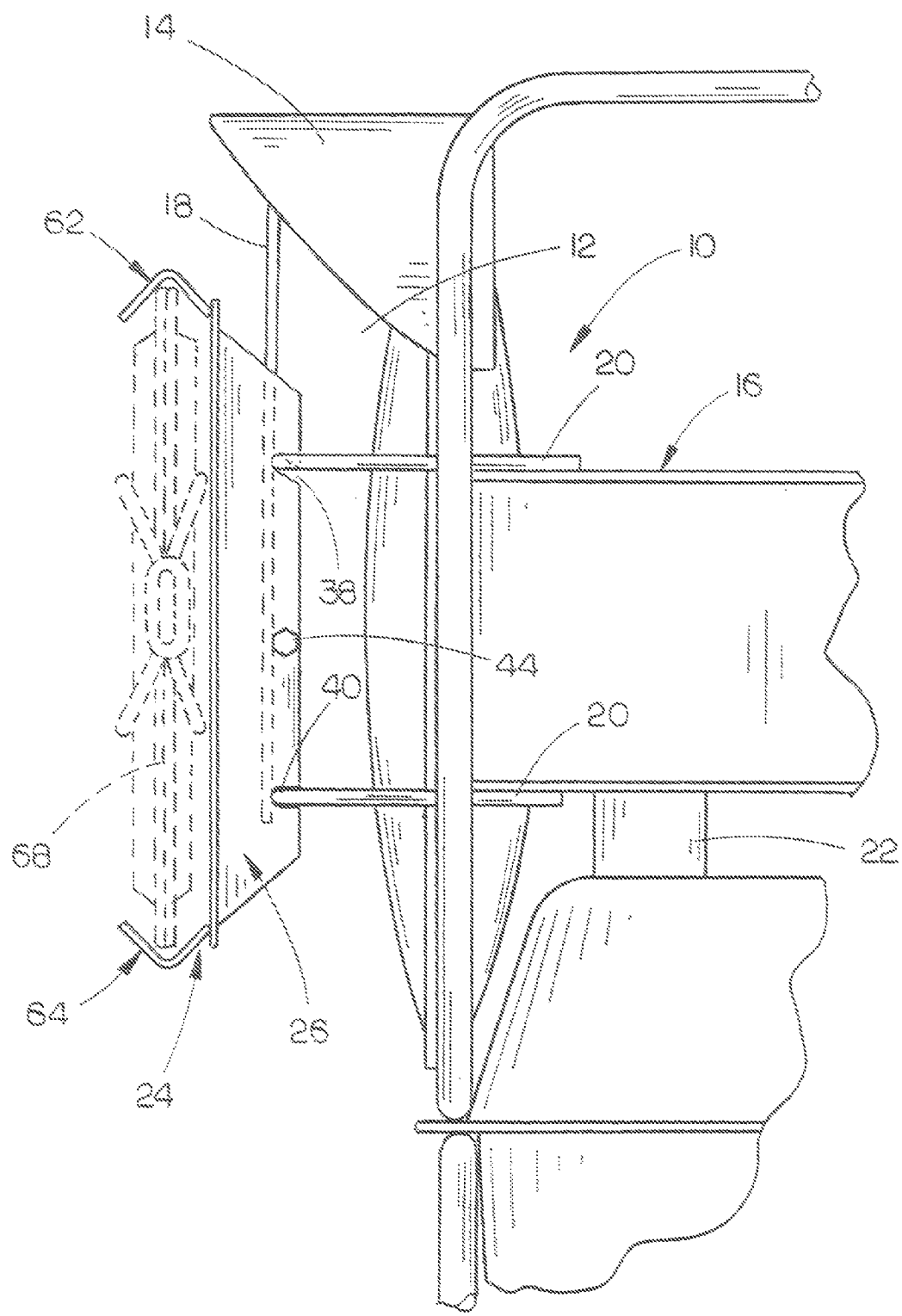
FIG. 2 is a partial side elevational view of the apparatus of this invention mounted on the heater.
Figure 3:
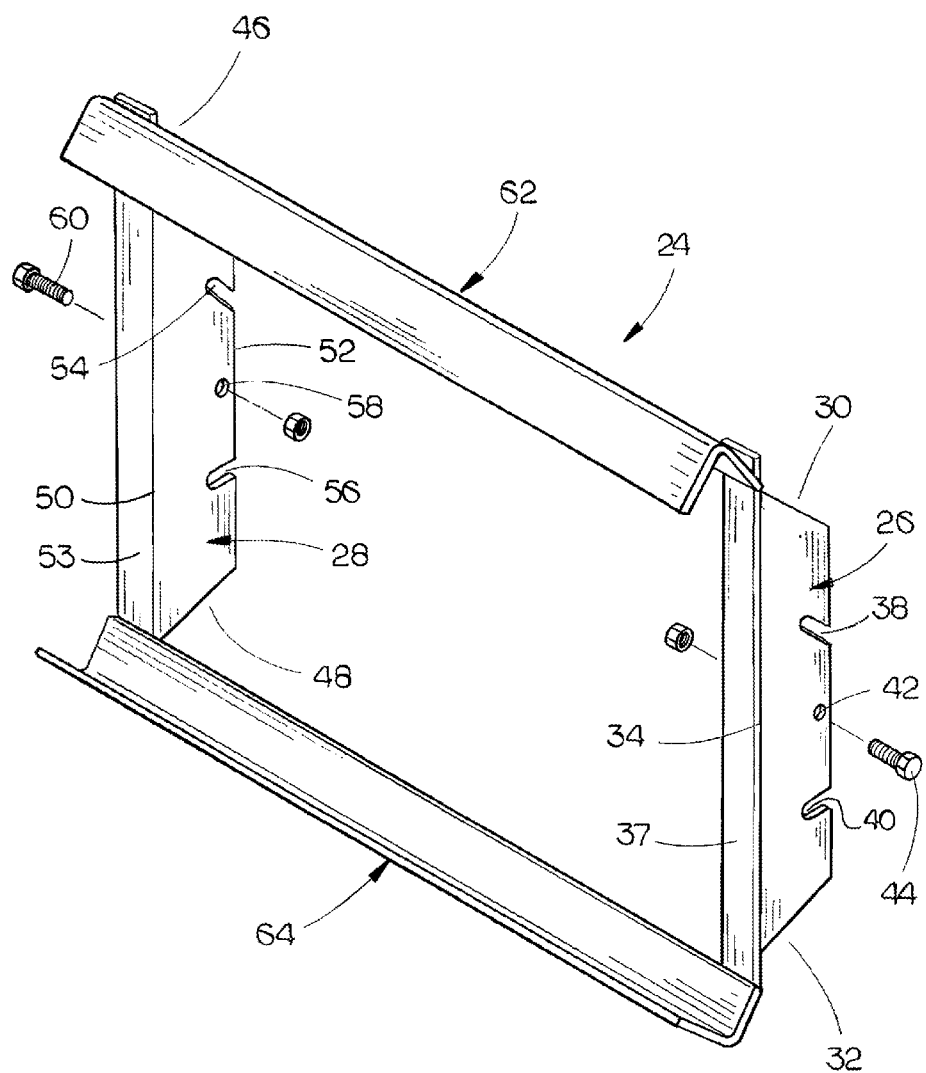
FIG. 3 is a perspective view of the apparatus of this invention.
Figure 4:
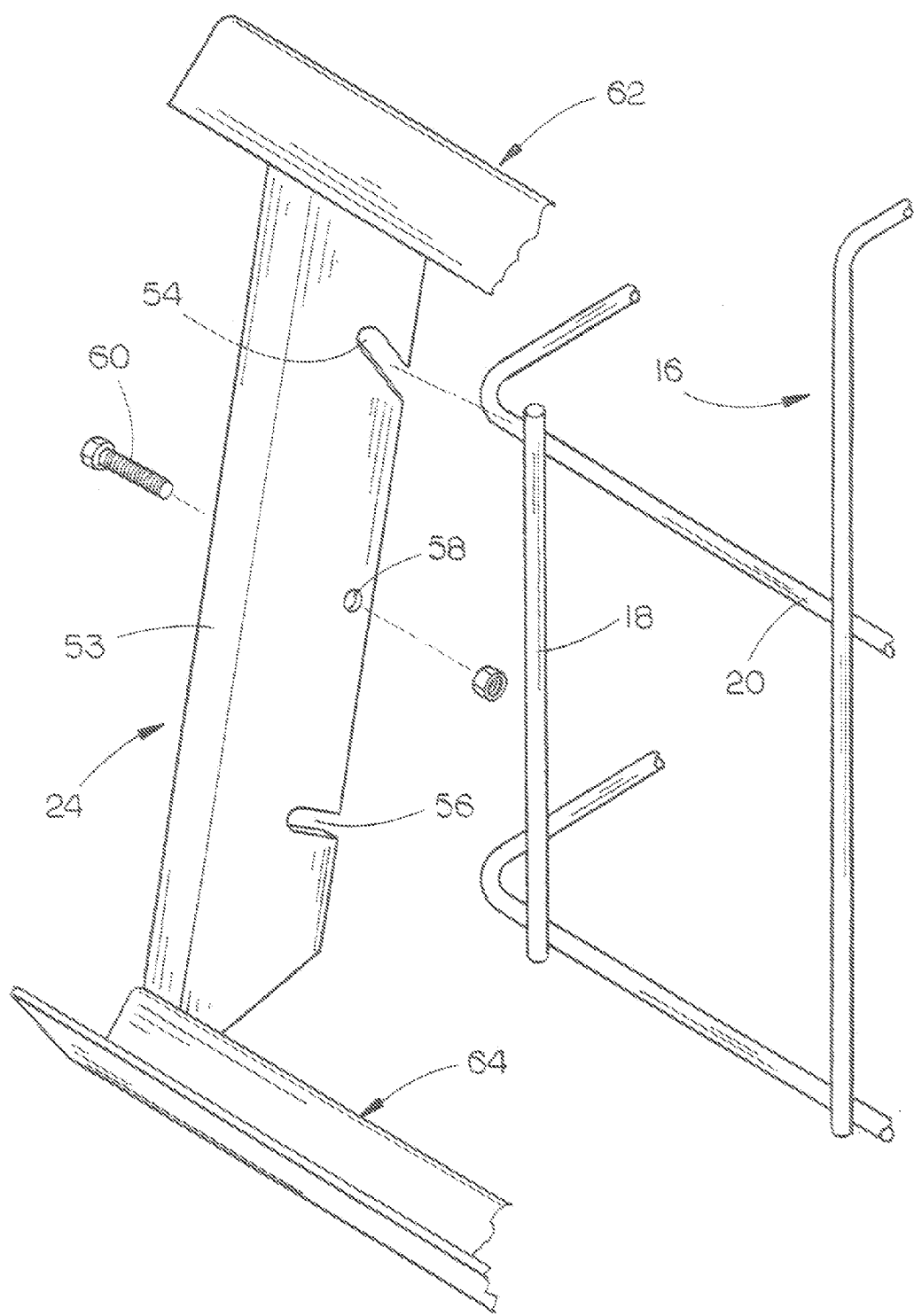
FIG. 4 is a partial perspective view of the apparatus of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

In the drawings, the numeral 10 refers to an infrared heater such as the Val6 Series heater manufactured and sold by Shizouka Seika Co., Ltd., having an address of 4-1 Yamana, Fukuroi-shi, Shizouka-ken, Japan 437-8601. The infrared heater 10 is diesel-fuel-fired and emits infrared rays from the discharge side of the heater 10. A curved shroud or shield 14 of conventional design is secured to the heater 10 above the discharge end thereof to prevent the heat emitted from the infra rays from passing upwardly therefrom.

Heater 10 includes a protective grill or safety guard 16 which is spaced outwardly of the discharge side 14 of heater 10. Grill 16 includes interconnected vertical rods 18 and horizontal rods 20. Grill 16 is supported by the frame 22 of the heater 10.

The numeral 24 refers to the assembly of this invention which is attached to the grill 16 as will now be described. Assembly 24 includes a pair of vertically disposed and horizontally spaced-apart side frames 26 and 28. Side frame 26 includes an upper end 30, a lower end 32, a forward end 34 and a rearward end 36. A flange 37 extends laterally outwardly from the forward end 36 of side frame 26.

A slot 38 extends inwardly and upwardly into the rearward end 36 of side frame 28 below the upper end 30 thereof. A slot 40 extends inwardly into the rearward end 36 of side frame 26 below slot 38. A bolt opening 42 is formed in side frame 26 adjacent the rearward end 36 thereof between slots 38 and 40 with the opening 42 adapted to receive a bolt 44 therein.

Side frame 28 includes an upper end 46, a lower end 48, a forward end 50 and a rearward end 52. A flange 53 extends laterally outwardly from the forward end 50 of side frame 28. A slot 54 extends inwardly and upwardly into the rearward end 52 of side frame 28 below the upper end 46 thereof. A slot 56 extends inwardly into the rearward end 52 of side frame 28 below slot 54. A bolt opening 58 is formed in side frame 28 adjacent the rearward end 52 thereof between slots 54 and 56 which is adapted to receive a bolt 60 therein.

A horizontally disposed support 62, having an inverted V-shaped or an inverted U-shaped cross-section, is secured to the forward ends 34 and 50 of side frames 26 and 28 respectively at the upper ends thereof by welding or the like and extends therebetween. A horizontally disposed support 64, having a V-shaped or U-shaped cross-section, is secured to the forward ends 34 and 50 of side frames 26 and 28 at the lower ends thereof by welding or the like and extends therebetween.

The numeral 66 refers to a conventional wire grill basket which is adapted to contain food therein such as meat, chicken, seafood, etc. therein. Basket 66 is adapted to be inserted into and supported by the support members 62 and 64 as illustrated in the drawings. A second basket 68 may also be inserted into and supported by the members 62 and 64.

In use, the food to be cooked is placed in the basket 66 or the baskets 66 and 68 and slidably inserted into the supports 62 and 64. The rays from the heater 10 will heat and cook the food in the basket or baskets. The intense heat from the heater tends to sear that side of the food facing the heater 10. After a predetermined time, such as 30-50 seconds, the basket or baskets are removed from the supports 62 and 64 and reversed and then re-inserted into the supports 62 and 64 so that the other side of the food is seared by the intense heat subjected thereto. The searing of the opposite sides of the food assists in maintaining the juices of the food therein. The baskets are reversed as needed until the food is cooked.

Thus it can be seen that the invention accomplishes all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. An apparatus for cooking food, comprising:
a wheeled frame;
an infrared heater mounted on said wheeled frame;
said infrared heater having a vertically disposed discharge side from which infrared rays are emitted;
said discharge side of said infrared heater having upper and lower ends;
a shroud positioned above said discharge side of said infrared heater to prevent the heat from the emitted infrared rays passing upwardly;
a vertically disposed protective grill which is disposed and spaced outwardly of said discharge side of said infrared heater;
said protective grill including interconnected vertical rods and horizontal rods;
said protective grill being secured to said wheeled frame;
said protective grill having upper and lower ends and first and second sides;
a cooking assembly secured to said protective grill;
said cooking assembly including first and second vertically disposed and horizontally spaced-apart side frames;
said first side frame including an upper end, a lower end, a forward end and a rearward end;
said first side frame including a flange which extends laterally outwardly from said forward end thereof;
said first side frame having a first slot formed therein which extends inwardly and upwardly into said rearward end thereof below said upper end thereof;
said first side frame having a second slot formed therein which extends thereinto from said rearward end thereof below said first slot thereof;
said second side frame including an upper end, a lower end, a forward end and a rearward end;
said second side frame including a flange which extends laterally outwardly from said forward end thereof;
said second side frame having a first slot formed therein which extends inwardly and upwardly into said rear r ward end thereof below said upper end thereof;
said second side frame having a second slot formed therein which extends thereinto from said rearward end thereof below said first slot thereof;
a horizontally disposed upper support having first and second ends;
said upper support having an inverted V-shaped cross-section or an inverted U-shaped cross-section;
said first end of said upper support being secured to said first side frame at the said upper end thereof;
said second end of said upper support being secured to said second side frame at said upper end thereof;
a horizontally disposed lower support having first and second ends;
said lower support having a V-shaped cross-section or a U-shaped cross-section;
said first end of said lower support being secured to said first side frame at said lower end thereof;
said second end of said lower support being secured to said second side frame at said lower end thereof;
said cooking assembly being secured to said protective grill by positioning the cooking assembly relative to said protective grill wherein horizontal rods of the protective grill are received by the first and second slots in said first and second side frames;
a vertically disposed wire grill basket having an upper end, a lower end, a first side and a second side;
said wire grill basket being configured to have food contained therein;
said wire grill basket configured to have its said upper end slidably received in said upper support and to have its said lower end slidably received in said lower support whereby rays emitted from said discharge side of said infrared heater will cook the food in said wire grill basket.

* * * * *